(12) United States Patent
Jiang et al.

(10) Patent No.: US 10,320,294 B2
(45) Date of Patent: Jun. 11, 2019

(54) DISCHARGING METHOD OF BUS CAPACITOR, CONTROLLER, DC-DC CONVERTER AND INVERTER

(71) Applicant: SUNGROW POWER SUPPLY CO., LTD., Hefei, Anhui (CN)

(72) Inventors: Tao Jiang, Anhui (CN); Peng Chen, Anhui (CN); Xiaofei Wang, Anhui (CN); Fei Li, Anhui (CN)

(73) Assignee: SUNGROW POWER SUPPLY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/474,045

(22) Filed: Mar. 30, 2017

(65) Prior Publication Data

US 2018/0006562 A1 Jan. 4, 2018

(30) Foreign Application Priority Data

Jun. 30, 2016 (CN) .......................... 2016 1 0518900

(51) Int. Cl.
*H02M 3/158* (2006.01)
*H02M 7/537* (2006.01)
*H02M 1/32* (2007.01)

(52) U.S. Cl.
CPC ......... *H02M 3/158* (2013.01); *H02M 3/1582* (2013.01); *H02M 7/537* (2013.01); *H02M 2001/322* (2013.01)

(58) Field of Classification Search
CPC ............ H02M 3/02; H02M 3/04; H02M 3/06; H02M 3/07; H02M 3/10; H02M 3/145;
(Continued)

(56) References Cited

U.S. PATENT DOCUMENTS 8,111,052 B2 * 2/2012 Glovinsky .............. H02M 1/34
323/225
8,115,457 B2 2/2012 Balakrishnan et al.
(Continued)

FOREIGN PATENT DOCUMENTS

CN 101989810 A 3/2011
CN 102801339 A 11/2012
(Continued)

OTHER PUBLICATIONS

English translation of JP 2004201439.*
(Continued)

*Primary Examiner* — Timothy J. Dole
*Assistant Examiner* — Carlos O Rivera-Perez
(74) *Attorney, Agent, or Firm* — Cantor Colburn LLP

(57) ABSTRACT

A discharging method of a bus capacitor, a controller, a DC-DC converter and an inverter are provided. After a DC-DC converter or an inverter is powered off, in a case that a detected voltage across a bus capacitor of the DC-DC converter or the inverter is determined to meet a preset condition, a switch of the DC-DC converter or the inverter is controlled to be turned on or turned off to cause the bus capacitor, the switch, and a reactor of the DC-DC converter or the inverter to form a current loop, until the voltage does not meet the preset condition. Based on the method, discharging function is achieved for the bus capacitor after the DC-DC converter or the inverter is powered off, without the need for an additional discharging circuit, which solves problems caused by the additional discharging circuit required in the conventional technology.

6 Claims, 3 Drawing Sheets

(58) Field of Classification Search
CPC ...... H02M 3/155; H02M 3/156; H02M 3/157; H02M 3/158; H02M 3/1582; H02M 3/1588; H02M 7/42; H02M 7/44; H02M 7/48; H02M 7/4826; H02M 7/53; H02M 7/537; H02M 7/5387; H02M 7/53871; H02M 7/53873; H02M 7/53875; H02M 7/5388; H02M 2007/4815; H02M 2007/53878; H02M 2001/322; B60L 11/005
USPC ........... 363/15–19, 21.02, 35, 40–43, 95–99, 363/123–127, 131–134; 323/205–211, 323/222–226, 271–275, 282–288, 299, 323/351; 320/118, 124, 125, 127–136, 320/166, 167

See application file for complete search history.

(56) References Cited

U.S. PATENT DOCUMENTS

| | | |
|---|---|---|
| 9,203,311 B2 | 12/2015 | Penzo et al. |
| 9,263,939 B2 | 2/2016 | Jin et al. |
| 9,331,581 B2 | 5/2016 | Chen |
| 2012/0055727 A1 | 3/2012 | Omiya et al. |
| 2015/0202967 A1* | 7/2015 | Syed .................. B60L 3/04 |
| | | 320/166 |
| 2017/0222641 A1* | 8/2017 | Zou .................. B60L 11/1803 |
| | | 318/139 |

FOREIGN PATENT DOCUMENTS

| | | |
|---|---|---|
| CN | 103219877 A | 7/2013 |
| CN | 104901531 A | 9/2015 |
| CN | 105099134 A | 11/2015 |
| DE | 102011087002 A1 | 5/2013 |
| EP | 2431211 A1 | 3/2012 |
| JP | S63209467 A | 8/1988 |
| JP | H0568379 A | 3/1993 |
| JP | 2004201439 A | 7/2004 |
| JP | 2005184965 A | 7/2005 |
| JP | 2009273336 A | 11/2009 |
| JP | 2015223057 A | 12/2015 |
| JP | 2016015828 A * | 1/2016 |

OTHER PUBLICATIONS

English translation of DE 102011087002.*
English translation of JP2016015828.*
Extended European Search Report for corresponding Application No. 17163273.0-1809; dated Nov. 8, 2017.
SIPO First Office Action corresponding to CN Patent Application No. 201610518900.4; dated Jan. 17, 2018.
First Office Action for corresponding JP Application No. 2017-068184; dated Jun. 5, 2018.

\* cited by examiner

DISCHARGING METHOD OF BUS CAPACITOR, CONTROLLER, DC-DC CONVERTER AND INVERTER

CROSS REFERENCE TO RELATED APPLICATION

The present application claims the priority to Chinese Patent Application No. 201610518900.4, titled "DISCHARGING METHOD OF BUS CAPACITOR, CONTROLLER, DC-DC CONVERTER AND INVERTER", filed on Jun. 30, 2016 with the State Intellectual Property Office of the People's Republic of China, which is incorporated herein by reference in its entirety.

TECHNICAL FIELD

The present disclosure relates to the technical field of power conversion, and in particular to a discharging method of a bus capacitor, a controller, a DC-DC converter and an inverter.

BACKGROUND

Presently, after various DC-DC converters or inverters power off, electric energy stored in a direct current bus capacitor needs to be discharged via an additional discharging circuit, otherwise, the waiting time for discharging is very long, thus leading to safety concern.

In a conventional discharging circuit, a discharging resistor with a high resistance is directly connected in parallel to a bus capacitor. After powered off, the bus capacitor discharges continuously via the discharging resistor. However, such a continuous discharge also occurs during operating of a system, which results in shortcomings of energy loss and low efficiency. In addition, for the discharging resistor connected in parallel to the high-voltage bus, insulation, heat dissipation and installation methods need to be taken into account.

In another conventional discharging circuit, a switching unit, a discharging unit connected to the bus capacitor via the switching unit, and a controlling unit connected to the switching unit are included. The controlling unit is configured to control, in a power-off state, the switching unit to be turned on to cause the discharging unit and the bus capacitor to form a discharging loop, and control, in a power-on state, the switching unit to be turned off. When this type of discharging circuit is applied in a high-voltage DC-DC converter, two of the discharging circuits are required, resulting a high hardware cost, and a large structural space being occupied. Therefore, a barrier to a design trend of small volume and high density is formed for a modular DC-DC converter.

In view of the above problems, it is urgent to provide a discharging method of a bus capacitor without the need for an additional discharging circuit.

SUMMARY

In view of the above, a discharging method of a bus capacitor, a controller, a DC-DC converter and an inverter are provided according to the present disclosure to solve the problem that an additional discharging circuit is required in the conventional technology.

To achieve the above object, the following technical solutions are provided according to the present disclosure.

A discharging method of a bus capacitor is provided according to the present disclosure. The method is applied to a controller of a DC-DC converter or of an inverter. The DC-DC converter or the inverter includes a bus capacitor, a switch and a reactor. The discharging method of a bus capacitor includes:

detecting a voltage across the bus capacitor;

determining whether the voltage across the bus capacitor meets a preset condition, after the DC-DC converter or the inverter is powered off; and controlling, in a case that the voltage across the bus capacitor meets the preset condition, the switch to be turned on or turned off to cause the bus capacitor, the switch and the reactor to form a current loop, until the voltage across the bus capacitor does not meet the preset condition.

Preferably, the determining whether the voltage across the bus capacitor meets a preset condition includes: determining whether the voltage across the bus capacitor is higher than or equal to a discharging threshold.

Preferably, in a case that the discharging method of a bus capacitor is applied to a bi-directional DC-DC converter, the bus capacitor includes a first bus capacitor and a second bus capacitor, the switch includes a first switch and a second switch connected in series, and a third switch and a fourth switch connected in series, and two series connection points are respectively connected to two terminals of the reactor; and the controlling, in a case that the voltage across the bus capacitor meets the preset condition, the switch to be turned on or turned off to cause the bus capacitor, the switch and the reactor to form a current loop, until the voltage across the bus capacitor does not meet the preset condition includes:

controlling, in a case that a voltage across the first bus capacitor meets the preset condition, the fourth switch to be turned on, and controlling the first switch to be turned on in response to a first preset periodic pulse, until the voltage across the first bus capacitor does not meet the preset condition; and controlling, in a case that a voltage across the second bus capacitor meets the preset condition, the second switch to be turned on, and controlling the third switch to be turned on in response to the first preset periodic pulse, until the voltage across the second bus capacitor does not meet the preset condition.

Preferably, in a case that the discharging method of a bus capacitor is applied to a bi-directional DC-DC converter, the bus capacitor includes a first bus capacitor and a second bus capacitor, the switch includes a first switch and a second switch connected in series, and a third switch and a fourth switch connected in series, and two series connection points are respectively connected to two terminals of the reactor; and the controlling, in a case that the voltage across the bus capacitor meets the preset condition, the switch to be turned on or turned off to cause the bus capacitor, the switch and the reactor to form a current loop, until the voltage across the bus capacitor does not meet the preset condition includes:

controlling, in a case that a voltage across the first bus capacitor and/or a voltage across the second bus capacitor meet the preset condition, two switch groups to be alternately turned on or turned off in response to a second preset periodic pulse, until neither the voltage across the first bus capacitor nor the voltage across the second bus capacitor meets the preset condition; where one of the two switch groups includes the first switch and the fourth switch that are simultaneously turned on or turned off, and the other of the two switch groups includes the second switch and the third switch that are simultaneously turned on or turned off.

A controller is provided according to the present disclosure. The controller is applied to a DC-DC converter or an inverter. The DC-DC converter or the inverter includes a bus capacitor, a switch and a reactor. The controller includes:

a detecting unit, configured to detect a voltage across the bus capacitor, after the DC-DC converter or the inverter is powered off;

a determining unit, configured to determine whether the voltage across the bus capacitor meets a preset condition; and a controlling unit, configured to control, in a case that the voltage across the bus capacitor meets the preset condition, the switch to be turned on or turned off to cause the bus capacitor, the switch and the reactor to form a current loop, until the voltage across the bus capacitor does not meet the preset condition.

Preferably, when the determining unit is configured to determine whether the voltage across the bus capacitor meets the preset condition, the determining unit is specifically configured to determine whether the voltage across the bus capacitor is higher than or equal to a discharging threshold.

A DC-DC converter is provided according to the present disclosure. The DC-DC converter includes a first circuit breaker, a second circuit breaker, a first contactor, a second contactor, a first bus capacitor, a second bus capacitor, a first switch, a second switch, a third switch, a fourth switch, a reactor and the controller described above.

The first switch, the second switch, the third switch and the fourth switch are each provided with an anti-parallel diode.

An emitter of the first switch is connected to a collector of the second switch, and a connection point is connected to a terminal of the reactor.

An emitter of the third switch is connected to a collector of the fourth switch, and a connection point is connected to the other terminal of the reactor.

A collector of the first switch is connected to a terminal of the first bus capacitor and is connected to a positive electrode of a first terminal of the first circuit breaker via the first contactor.

An emitter of the second switch is connected to the other terminal of the first bus capacitor and a negative electrode of the first terminal of the first circuit breaker.

A collector of the third switch is connected to a terminal of the second bus capacitor and is connected to a positive electrode of a first terminal of the second circuit breaker via the second contactor.

An emitter of the fourth switch is connected to the other terminal of the second bus capacitor and a negative electrode of the first terminal of the second circuit breaker.

A first input terminal of the controller is connected to two terminals of the first bus capacitor, a second input terminal of the controller is connected to two terminals of the second bus capacitor, and an output terminal of the controller is connected to bases of the first switch, the second switch, the third switch and the fourth switch.

Preferably, when the controlling unit of the controller is configure to control, in a case that the voltage across the bus capacitor meets the preset condition, the switch to be turned on or turned off to cause the bus capacitor, the switch and the reactor to form the current loop, the controlling unit of the controller is specifically configured to:

control, in a case that a voltage across the first bus capacitor meets the preset condition, the fourth switch to be turned on, and control the first switch to be turned on in response to a first preset periodic pulse, until the voltage across the first bus capacitor does not meet the preset condition; and control, in a case that a voltage across the second bus capacitor meets the preset condition, the second switch to be turned on, and control the third switch to be turned on in response to the first preset periodic pulse, until the voltage across the second bus capacitor does not meet the preset condition.

Preferably, when the controlling unit of the controller is configure to control, in a case that the voltage across the bus capacitor meets the preset condition, the switch to be turned on or turned off to cause the bus capacitor, the switch and the reactor to form the current loop, the controlling unit of the controller is specifically configured to:

control, in a case that a voltage across the first bus capacitor and/or a voltage across the second bus capacitor meet the preset condition, two switch groups to be alternately turned on or turned off in response to a second preset periodic pulse, until neither the voltage across the first bus capacitor nor the voltage across the second bus capacitor meets the preset condition, where one of the two switch groups includes the first switch and the fourth switch that are simultaneously turned on or turned off, and the other of the two switch groups includes the second switch and the third switch that are simultaneously turned on or turned off.

An inverter including the controller described above is provided according to the present disclosure. The inverter is a three-phase full-bridge photovoltaic inverter, a three-phase full-bridge energy storage inverter, a multi-level photovoltaic inverter, or a multi-level energy storage inverter.

In the discharging method of a bus capacitor according to the present disclosure, after the DC-DC converter or the inverter is powered off, in a case that the detected voltage across the bus capacitor of the DC-DC converter or the inverter is determined to meet the preset condition, the switch of the DC-DC converter or the inverter is controlled to be turned on or turned off to cause the bus capacitor, the switch and the reactor of the DC-DC converter or the inverter to form the current loop, until the voltage across the bus capacitor does not meet the preset condition. Based on the method, a discharging function is achieved for the bus capacitor after the DC-DC converter or the inverter is powered off, without the need for an additional discharging circuit, which solves the problems caused by the additional discharging circuit required in the conventional technology.

BRIEF DESCRIPTION OF THE DRAWINGS

To illustrate technical solutions in embodiments of the present disclosure or in the conventional technology more clearly, drawings used in the descriptions of the embodiments or the conventional technology are introduced briefly hereinafter. Apparently, the drawings described hereinafter merely illustrate some embodiments of the present disclosure, and other drawings may be obtained by those skilled in the art based on those drawings without any creative efforts.

DETAILED DESCRIPTION OF THE EMBODIMENTS

Technical solutions in embodiments of the present disclosure are clearly and completely described hereinafter in conjunction with the drawings of the embodiments of the present disclosure. Apparently, the described embodiments are only a few rather than all of the embodiments of the invention. All other embodiments obtained by those skilled in the art based on the embodiments of the present disclosure without any creative efforts fall within the protection scope of the present disclosure.

A discharging method of a bus capacitor is provided according to the present disclosure to solve the problem that an additional discharging circuit is required in the conventional technology.

Figure 1:
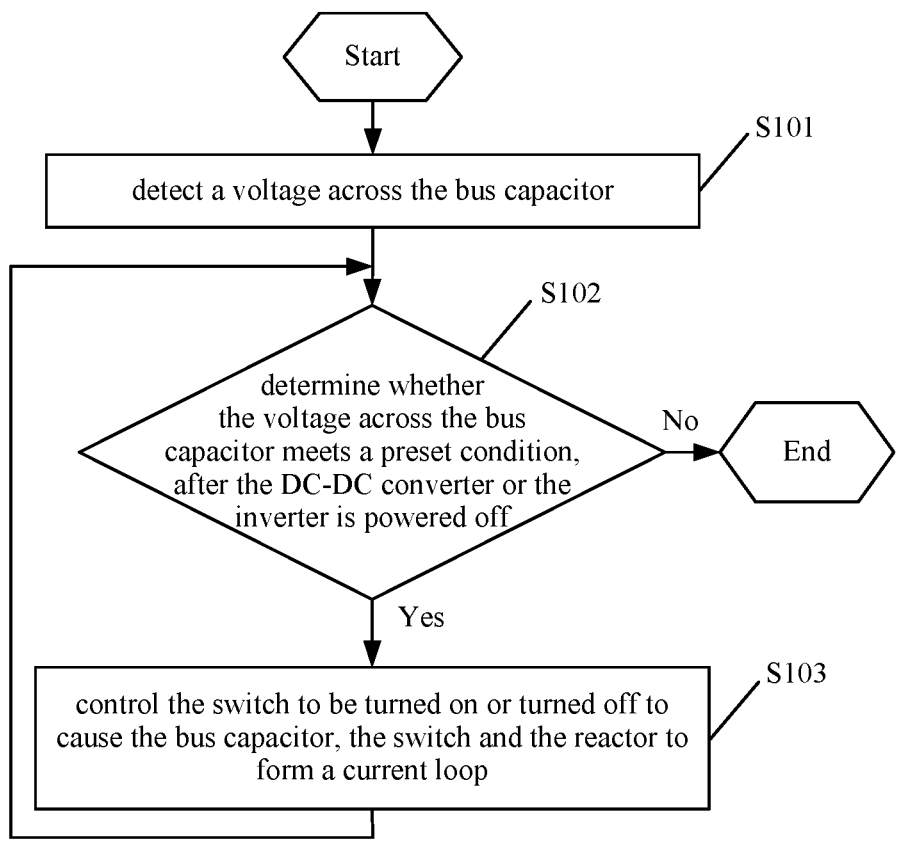
FIG. 1 is a flow chart of a discharging method of a bus capacitor according to an embodiment of the present disclosure.

The discharging method of a bus capacitor is applied to a controller of a DC-DC converter or of an inverter. The DC-DC converter or the inverter includes a bus capacitor, a switch and a reactor. The discharging method of a bus capacitor includes steps S101 to S103, as shown in FIG. 1.

In step S101, a voltage across the bus capacitor is detected.

In practical applications, the voltage across the bus capacitor may be detected in a real-time manner. After the DC-DC converter or the inverter is powered off, there is residual power on the bus capacitor, and there is still a high voltage across the bus capacitor. In a case that there is no discharging circuit, theoretically, the voltage will remain. In practice, the voltage will decay slowly due to parasitic impedance of the bus, with a long discharging time. Therefore, the discharging method of a bus capacitor according to the embodiment may be applied to discharging of the bus capacitor.

In step S102, after the DC-DC converter or the inverter is powered off, whether the voltage across the bus capacitor meets a preset condition is determined.

After the voltage across the bus capacitor is detected, whether the voltage across the bus capacitor meets the preset condition is determined to obtain a result of whether discharge is required.

In step S103, in a case that the voltage across the bus capacitor meets the preset condition, the switch is controlled to be turned on or turned off to cause the bus capacitor, the switch and the reactor to form a current loop, until the voltage across the bus capacitor does not meet the preset condition.

In a case that the voltage across the bus capacitor meets the preset condition, it is indicated that the bus capacitor requires discharging, otherwise, a potential hazard may be caused. Specifically, the current loop may be formed by the bus capacitor and the reactor with the switch, and the residual power on the bus capacitor may be consumed in devices of the loop and in the circuit, via a power flow in the current loop, until the voltage across the bus capacitor does not meet the preset condition, thereby achieving discharging for the bus capacitor.

In the discharging method of a bus capacitor according to the embodiment, after the DC-DC converter or the inverter is powered off, a discharging function is achieved for the bus capacitor through the above steps without the need for an additional discharging circuit. As a result, no hardware component is added, and no additional loss is caused to normal operation of the circuit, avoiding problems in the conventional technology brought by a discharging resistor such as energy loss, low efficiency, and considerations of insulation, heat dissipation and installation methods. In addition, a barrier to a design trend of small volume and high density for a modular DC-DC converter is avoided. Therefore, the problems caused by an additional discharging circuit required in the conventional technology are solved.

Preferably, step S102 includes determining whether the voltage across the bus capacitor is higher than a discharging threshold.

For a bi-directional DC-DC converter, the discharging threshold may be 60V, which is not specifically limited herein and may be determined based on practical application environments.

A detailed discharging method of a bus capacitor is further provided according to another embodiment of the present disclosure. That is, the discharging method of a bus capacitor is applied to a bi-directional DC-DC inverter shown in FIG. 2. The bus capacitor includes a first bus capacitor C1 and a second bus capacitor C2. The switch includes a first switch Q1 and a second switch Q2 connected in series, and a third switch Q3 and a fourth switch Q4 connected in series. Two series connection points are respectively connected to two terminals of the reactor L.

On the basis of FIG. 1, step S103 includes:

controlling, in a case that a voltage across the first bus capacitor meets the preset condition, the fourth switch to be turned on, and controlling the first switch to be turned on in response to a first preset periodic pulse, until the voltage across the first bus capacitor does not meet the preset condition; and controlling, in a case that a voltage across the second bus capacitor meets the preset condition, the second switch to be turned on, and controlling the third switch to be turned on in response to the first preset periodic pulse, until the voltage across the second bus capacitor does not meet the preset condition.

Figure 2:
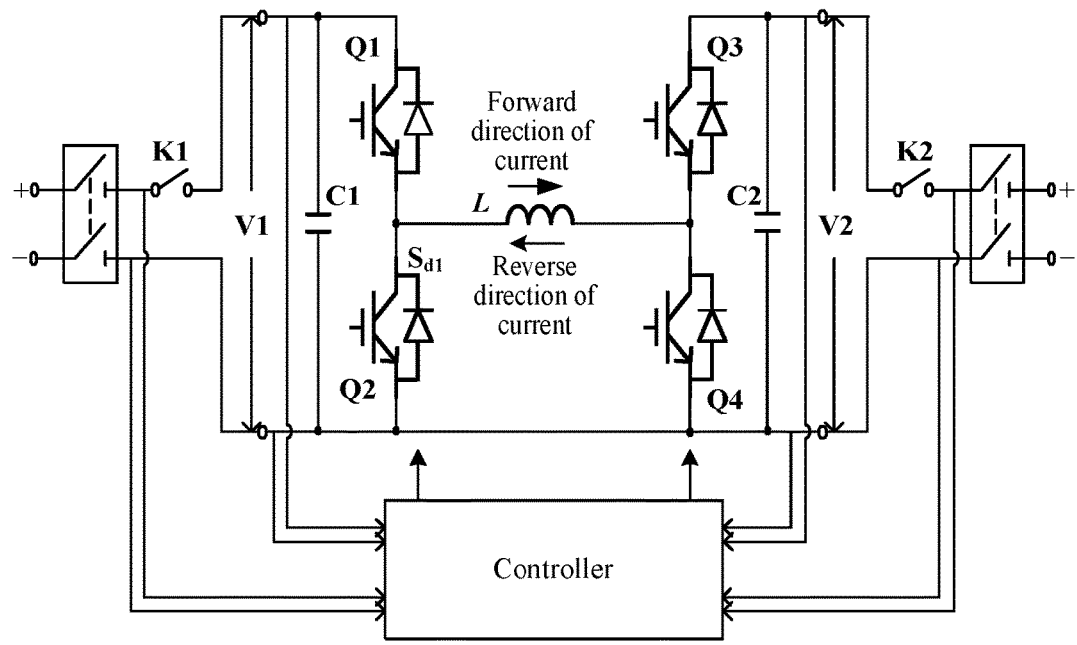
FIG. 2 is a schematic diagram of a circuit of a DC-DC inverter according to an embodiment of the present disclosure.
Figure 3:
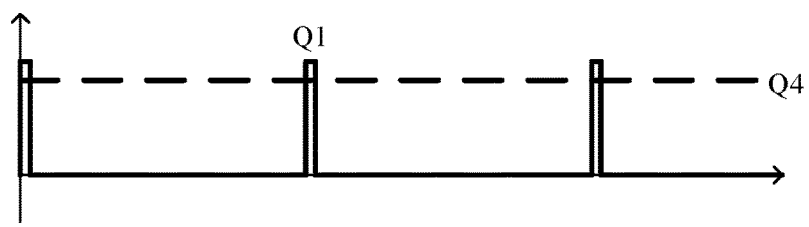
FIG. 3 is a waveform diagram of a turn-on control signal for a switch according to an embodiment of the present disclosure.

Specifically, reference is made to FIG. 2. After the bi-directional DC-DC converter is powered off, the controller detects the voltages across the first bus capacitor C1 and the second bus capacitor C2. In a case that the voltage V1 across the first bus capacitor C1 meets the preset condition (for example, V1 is higher than or equal to the discharging threshold of 60V), the controller controls the fourth switch Q4 to be turned on, and controls the first switch Q1 to be turned on in response to the first preset periodic pulse. Waveforms of turn-on control signals for the first switch Q1 and the fourth switch Q4 are shown in FIG. 3. The waveform of the turn-on control signal for the fourth switch Q4 is a continuous high level (as indicated by the dotted line in FIG. 3), and the waveform of the turn-on control signal for the first switch Q1 is a pulse (as indicated by the solid line in FIG. 3).

In a case that the first switch Q1 is turned on, the first bus capacitor C1, the first switch Q1, the reactor L and the fourth switch Q4 form a current loop of a power flow, and a low forward current may flow through the reactor L.

In a case that the first switch Q1 is turned off, the current in the reactor L freewheels, anti-parallel diode of the second switch Q2 is turned on, and the anti-parallel diode of the second switch Q2, the reactor L and the fourth switch Q4 form a current loop of a power flow.

The first switch Q1 is turned on in response to the first preset periodic pulse, resulting in a short turn-on time of the first switch Q1 and a low current in the reactor L. Therefore, in a turn-off time of the first switch Q1, the current in the reactor L may decay to zero or near zero due to turn-on loss of diodes and line impedances, which avoids net increase of the current in the reactor L during a switching period, and thus avoids that the current in the reactor L becomes uncontrollable after multiple switching periods. In this way, after multiple switching periods, the voltage V1 across the first bus capacitor C1 decreases below the discharging threshold, and the controller can stop the discharging of the first bus capacitor C1.

The discharge principle of the second bus capacitor C2 is the same as that of the first bus capacitor C1 described above, which is not described herein.

Alternatively, in another embodiment of the present disclosure, the discharging method of a bus capacitor is applied to a bi-directional DC-DC inverter shown in FIG. 2. The bus capacitor includes a first bus capacitor C1 and a second bus capacitor C2. The switch includes a first switch Q1 and a second switch Q2 connected in series, and a third switch Q3 and a fourth switch Q4 connected in series. Two series connection points are respectively connected to two terminals of the reactor L.

Step S103 includes:

controlling, in a case that a voltage across the first bus capacitor and/or a voltage across the second bus capacitor meet the preset condition, two switch groups to be alternately turned on or turned off in response to a second preset periodic pulse, until neither the voltage across the first bus capacitor nor the voltage across the second bus capacitor meets the preset condition, where one of the two switch groups includes the first switch and the fourth switch that are simultaneously turned on or turned off, and the other of the two switch groups includes the second switch and the third switch that are simultaneously turned on or turned off.

In the embodiment, as shown in FIG. 2, in a case that the voltage across the first bus capacitor C1 and/or the voltage across the second bus capacitor C2 meet the preset condition (for example, V1 is higher than or equal to the discharging threshold of 60V), the controller controls, the switch group of the first switch Q1 and the fourth switch Q4 and the switch group of the second switch Q2 and the third switch Q3, to be alternately turned on or turned off. The first switch Q1 and the fourth switch Q4 are turned on or turned off simultaneously, and the second switch Q2 and the third switch Q3 are turned on or turned off simultaneously.

In a case that the first switch Q1 and the fourth switch Q4 are simultaneously turned on, the first bus capacitor C1, the reactor L, the first switch Q1 and the fourth switch Q4 form a current loop of a power, and a current in the reactor L increases in the forward direction.

Figure 4:
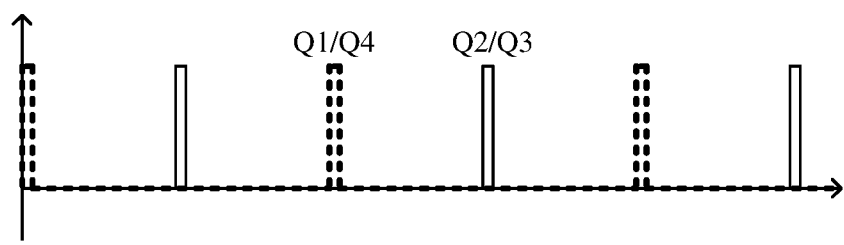
FIG. 4 is a waveform diagram of turn-on control signals for switches according to another embodiment of the present disclosure.

In a case that the first switch Q1 and the fourth switch Q4 are simultaneously turned off, the current in the reactor L freewheels, and charges the second bus capacitor C2 via the anti-parallel diodes of the second switch Q2 and the third switch Q3. The controller controls the first switch Q1 and the fourth switch Q4 to be turned on in response to the second preset periodic pulse, and may control a turn-on time of the first switch Q1 and the fourth switch Q4 to be short. The current in the reactor L may quickly decay to zero or near zero. Waveforms of turn-on control signals for the switches are shown in FIG. 4 which takes a case that the first switch Q1 and the fourth switch Q4 are turned on firstly as an example for illustration. The pulses, sequence numbers of which are odd, are the turn-on control signals for the first switch Q1 and the fourth switch Q4 (as indicated by the thick dash line in FIG. 4). The pulses, sequence numbers of which are even, are the turn-on control signals for the second switch Q2 and the third switch Q3 (as indicated by the thin solid line in FIG. 4).

In the next period, the switch group of the second switch Q2 and the third switch Q3 is turned on or turned off. Similarly, in a case that the second switch Q2 and the third switch Q3 are simultaneously turned on, the second bus capacitor C2, the reactor L, the second switch Q2 and the third switch Q3 form a current loop of a power, and a current in the reactor L increases in the reverse direction.

In a case that the second switch Q2 and the third switch Q3 are simultaneously turned off, the current in the reactor L freewheels, and charges the first bus capacitor C1 via the anti-parallel diodes of the first switch Q1 and the fourth switch Q4. The controller controls the second switch Q2 and the third switch Q3 to be turned on in response to the second preset periodic pulse, and may control a turn-on time of the second switch Q2 and the third switch Q3 to be short. The current in the reactor L may quickly decay to zero or near zero.

Power loss may occur in turn-on and turn-off processes of the switches and in the process of forming the power flow described above. After a number of turn-on and turn-off periods, when the voltage V1 and the voltage V2 are lower than the discharging threshold, the controller can stop discharging of the first bus capacitor C1 and the second bus capacitor C2.

Figure 5:
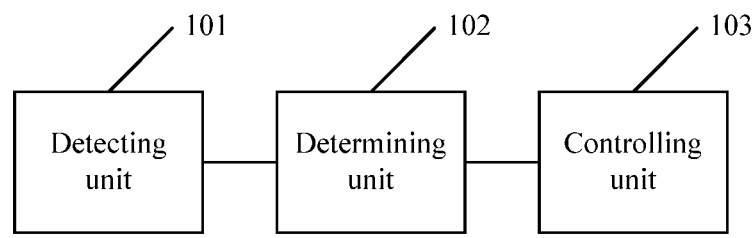
FIG. 5 is a schematic structural diagram of a controller according to an embodiment of the present disclosure.

A controller is further provided according to another embodiment of the present disclosure, which is applied to a DC-DC converter or an inverter. The DC-DC converter or the inverter includes a bus capacitor, a switch and a reactor. As shown in FIG. 5, the controller includes:

a detecting unit 101, configured to detect a voltage across the bus capacitor;

a determining unit 102, configured to determine whether the voltage across the bus capacitor meets a preset condition, after the DC-DC converter or the inverter is powered off; and a controlling unit 103, configured to control, in a case that the voltage across the bus capacitor meets the preset condition, the switch to be turned on or turned off to cause the bus capacitor, the switch and the reactor to form a current loop.

Based on the controller according to the embodiment, after the DC-DC converter or the inverter is powered off, a discharging function can be achieved for the bus capacitor by the above principles, without the need for an additional discharging circuit, which avoids problems in the conventional technology brought by a discharging resistor such as energy loss, low efficiency, and considerations of insulation, heat dissipation and installation methods. In addition, a barrier to a design trend of small volume and high density for a modular DC-DC converter is avoided. Therefore, the problems caused by an additional discharging circuit required in the conventional technology are solved.

When the controller is applied to the DC-DC converter or the inverter, the controller may be a separate control part, or may be integrated in an original controller of the DC-DC converter or the inverter, which is not specifically limited herein. Both of the above cases fall within the protection scope of the present disclosure.

Preferably, when the determining unit 102 is configured to determine whether the voltage across the bus capacitor meets the preset condition, the determining unit 102 is specifically configured to determine whether the voltage across the bus capacitor is higher than a discharging threshold.

For a bi-directional DC-DC converter, the discharging threshold may be 60V, which is not specifically limited herein and may be determined based on practical application environments.

A DC-DC converter is further provided according to another embodiment of the present disclosure, as shown in FIG. 2. The DC-DC converter includes a first circuit breaker, a second circuit breaker, a first contactor K1, a second contactor K2, a first bus capacitor C1, a second bus capacitor C2, a first switch Q1, a second switch Q2, a third switch Q3, a fourth switch Q4, a reactor L and the controller according to the above embodiments.

The first switch Q1, the second switch Q2, the third switch Q3 and the fourth switch Q4 are each provided with an anti-parallel diode.

An emitter of the first switch Q1 is connected to a collector of the second switch Q2, and a connection point is connected to a terminal of the reactor L.

An emitter of the third switch Q3 is connected to a collector of the fourth switch Q4, and a connection point is connected to the other terminal of the reactor L.

A collector of the first switch Q1 is connected to a terminal of the first bus capacitor C1 and is connected to a positive electrode of a first terminal of the first circuit breaker via the first contactor K1.

An emitter of the second switch Q2 is connected to the other terminal of the first bus capacitor C1 and a negative electrode of the first terminal of the first circuit breaker.

A collector of the third switch Q3 is connected to a terminal of the second bus capacitor C2 and is connected to a positive electrode of a first terminal of the second circuit breaker via the second contactor K2.

An emitter of the fourth switch Q4 is connected to the other terminal of the second bus capacitor C2 and a negative electrode of the first terminal of the second circuit breaker.

A first input terminal of the controller is connected to two terminals of the first bus capacitor C1, a second input terminal of the controller is connected to two terminals of the second bus capacitor C2, and an output terminal of the controller is connected to bases of the first switch Q1, the second switch Q2, the third switch Q3 and the fourth switch Q4.

In the DC-DC converter shown in FIG. 2, the first switch Q1 is a forward BUCK switch, the second switch Q2 is a reverse BOOST switch, the third switch Q3 is a reverse BUCK switch, and the fourth switch Q4 is a forward BOOST switch, which makes the DC-DC converter achieve bi-directional DC-DC conversion. That is, the DC-DC converter shown in FIG. 2 is a bi-directional DC-DC converter.

In the DC-DC converter according to the embodiment, the controller according to the above embodiments is provided. After the DC-DC converter is powered off, a discharging function can be achieved for the bus capacitor by the above principles, without the need for an additional discharging circuit, which avoids problems in the conventional technology brought by a discharging resistor such as energy loss, low efficiency, and considerations of insulation, heat dissipation and installation methods. In addition, a barrier to a design trend of small volume and high density for a modular DC-DC converter is avoided. Therefore, the problems caused by an additional discharging circuit required in the conventional technology are solved.

Preferably, when the controlling unit of the controller is configure to control, in a case that the voltage across the bus capacitor meets the preset condition, the switch to be turned on or turned off to cause the bus capacitor, the switch and the reactor to form the current loop, the controlling unit of the controller is specifically configured to:

control, in a case that a voltage across the first bus capacitor meets the preset condition, the fourth switch to be turned on, and control the first switch to be turned on in response to a first preset periodic pulse, until the voltage across the first bus capacitor does not meet the preset condition; and control, in a case that a voltage across the second bus capacitor meets the preset condition, the second switch to be turned on, and control the third switch to be turned on in response to the first preset periodic pulse, until the voltage across the second bus capacitor does not meet the preset condition.

Preferably, when the controlling unit of the controller is configure to control, in a case that the voltage across the bus capacitor meets the preset condition, the switch to be turned on or turned off to cause the bus capacitor, the switch and the reactor to form the current loop, the controlling unit of the controller is specifically configured to:

control, in a case that a voltage across the first bus capacitor and/or a voltage across the second bus capacitor meet the preset condition, two switch groups to be alternately turned on or turned off in response to a second preset periodic pulse, until neither the voltage across the first bus capacitor nor the voltage across the second bus capacitor meets the preset condition, where one of the two switch groups includes the first switch and the fourth switch that are simultaneously turned on or turned off, and the other of the two switch groups includes the second switch and the third switch that are simultaneously turned on or turned off.

The detailed operating principles are the same as those in the above embodiments, which are not described herein.

An inverter is further provided according to another embodiment of the present disclosure, which includes the controller described above. The inverter is a three-phase full-bridge photovoltaic inverter, a three-phase full-bridge energy storage inverter, a multi-level photovoltaic inverter, or a multi-level energy storage inverter.

The detailed operating principles are the same as those in the above embodiments, which are not described herein. With the controller according to the above embodiments, a discharging function is achieved for the bus capacitor, without the need for an additional discharging circuit, which avoids problems in the conventional technology brought by a discharging resistor such as energy loss, low efficiency, and considerations of insulation, heat dissipation and installation methods. In addition, a high-voltage relay and a discharging resistor in an original discharging circuit are not required, reducing a hardware cost. Therefore, the problems caused by an additional discharging circuit required in the conventional technology are solved.

The various embodiments of the present disclosure are described in a progressive manner, differences from other embodiments are emphatically illustrated in each embodiment, and reference can be made to each other for understanding the same or similar sections. Since the devices disclosed by the embodiments correspond to the methods disclosed by the embodiments, the devices are described briefly and reference can be made to descriptions of the methods for understanding related sections.

The above descriptions are only preferred embodiments of the invention, which enable those skilled in the art to understand or implement the present disclosure. Various changes to the embodiments are obvious to those skilled in the art, and general principles defined herein may be implemented in other embodiments without departing from the spirit or scope of the present disclosure. Therefore, the invention is not limited to the embodiments disclosed herein, but is to conform to the widest scope consistent with the principles and the novel features disclosed herein.

The invention claimed is:

1. A discharging method of a bus capacitor, applied to a controller of a DC-DC converter, wherein the DC-DC converter comprises the bus capacitor, a switch and a reactor, and the discharging method of the bus capacitor comprises:
   detecting a voltage across the bus capacitor;
   determining whether the voltage across the bus capacitor meets a preset condition, after the DC-DC converter is powered off; and
   controlling, in a case that the voltage across the bus capacitor meets the preset condition, the switch to be turned on or turned off to cause the bus capacitor, the switch and the reactor to form a current loop for consuming residual power of the bus capacitor, until the voltage across the bus capacitor does not meet the preset condition;
   wherein the DC-DC converter is a bi-directional DC-DC converter, the bus capacitor comprises a first bus capacitor and a second bus capacitor, the switch comprises a first switch and a second switch connected in series, and a third switch and a fourth switch connected in series, and two series connection points are respectively connected to two terminals of the reactor; and
   wherein the controlling, in a case that the voltage across the bus capacitor meets the preset condition, the switch to be turned on or turned off to cause the bus capacitor, the switch and the reactor to form a current loop for consuming residual power of the bus capacitor, until the voltage across the bus capacitor does not meet the preset condition comprises:
   controlling, in a case that a voltage across the first bus capacitor meets the preset condition, the fourth switch to be turned on, and controlling the first switch to be turned on in response to a first preset periodic pulse, until the voltage across the first bus capacitor does not meet the preset condition, wherein in each period of the first preset periodic pulse, a current in the reactor decays to zero in a turn-off time of the first switch; and
   controlling, in a case that a voltage across the second bus capacitor meets the preset condition, the second switch to be turned on, and controlling the third switch to be turned on in response to the first preset periodic pulse, until the voltage across the second bus capacitor does not meet the preset condition, wherein in each period of the first preset periodic pulse, a current in the reactor decays to zero in a turn-off time of the third switch.

2. The discharging method of the bus capacitor according to claim 1, wherein the determining whether the voltage across the bus capacitor meets a preset condition comprises: determining whether the voltage across the bus capacitor is higher than or equal to a discharging threshold.

3. A controller applied to a DC-DC converter, wherein the DC-DC converter comprises a bus capacitor, a switch and a reactor, and the controller comprises:
   a detecting unit, configured to detect a voltage across the bus capacitor;
   a determining unit, configured to determine whether the voltage across the bus capacitor meets a preset condition, after the DC-DC converter is powered off; and
   a controlling unit, configured to control, in a case that the voltage across the bus capacitor meets the preset condition, the switch to be turned on or turned off to cause the bus capacitor, the switch and the reactor to form a current loop for consuming residual power of the bus capacitor, until the voltage across the bus capacitor does not meet the preset condition;
   wherein the DC-DC converter is a bi-directional DC-DC converter, the bus capacitor comprises a first bus capacitor and a second bus capacitor, the switch comprises a first switch and a second switch connected in series, and a third switch and a fourth switch connected in series, and two series connection points are respectively connected to two terminals of the reactor; and
   wherein controlling, in a case that the voltage across the bus capacitor meets the preset condition, the switch to be turned on or turned off to cause the bus capacitor, the switch and the reactor to form the current loop for consuming residual power of the bus capacitor, until the voltage across the bus capacitor does not meet the preset condition comprises one of:
   1) controlling, in a case that a voltage across the first bus capacitor meets the preset condition, the fourth switch to be turned on, and controlling the first switch to be turned on in response to a first preset periodic pulse, until the voltage across the first bus capacitor does not meet the preset condition, wherein in each period of the first preset periodic pulse, a current in the reactor decays to zero in a turn-off time of the first switch; and
   controlling, in a case that a voltage across the second bus capacitor meets the preset condition, the second switch to be turned on, and controlling the third switch to be turned on in response to the first preset periodic pulse, until the voltage across the second bus capacitor does not meet the preset condition, wherein in each period of the first preset periodic pulse, a current in the reactor decays to zero in a turn-off time of the third switch; and
   2) controlling, in a case that the voltage across the first bus capacitor and/or the voltage across the second bus capacitor meet the preset condition, a first switch group and a second switch group to be alternately turned on or turned off, until neither the voltage across the first bus capacitor nor the voltage across the second bus capacitor meets the preset condition, wherein the first switch group is controlled to be turned on or turned off in response to a second preset periodic pulse, the second switch group is controlled to be turned on or turned off in response to a third preset periodic pulse;
   wherein duty ratios of the second preset periodic pulse and the third preset periodic pulse are the same, and the second preset periodic pulse and the third preset periodic pulse are different in phase so that the first switch group and the second switch group are not simultaneously turned on;
   wherein the first switch group comprises the first switch and the fourth switch that are simultaneously turned on or turned off, and the second switch group comprises the second switch and the third switch that are simultaneously turned on or turned off; and
   wherein each time both the first switch group and the second switch group are turned off, a current in the reactor decays to zero.

4. The controller according to claim 3, wherein when the determining unit is configured to determine whether the voltage across the bus capacitor meets the preset condition, the determining unit is specifically configured to determine whether the voltage across the bus capacitor is higher than or equal to a discharging threshold.

5. The DC-DC converter, comprising: a first circuit breaker, a second circuit breaker, a first contactor, a second contactor, a first bus capacitor, a second bus capacitor, a first switch, a second switch, a third switch, a fourth switch, the reactor and the controller according to claim 3, wherein the first switch, the second switch, the third switch and the fourth switch are each provided with an anti-parallel diode;

an emitter of the first switch is connected to a collector of the second switch, and a connection point is connected to a terminal of the reactor;

an emitter of the third switch is connected to a collector of the fourth switch, and a connection point is connected to the other terminal of the reactor;

a collector of the first switch is connected to a terminal of the first bus capacitor and is connected to a positive electrode of a first terminal of the first circuit breaker via the first contactor;

an emitter of the second switch is connected to the other terminal of the first bus capacitor and a negative electrode of the first terminal of the first circuit breaker;

a collector of the third switch is connected to a terminal of the second bus capacitor and is connected to a positive electrode of a first terminal of the second circuit breaker via the second contactor;

an emitter of the fourth switch is connected to the other terminal of the second bus capacitor and a negative electrode of the first terminal of the second circuit breaker; and a first input terminal of the controller is connected to two terminals of the first bus capacitor, a second input terminal of the controller is connected to two terminals of the second bus capacitor, and an output terminal of the controller is connected to bases of the first switch, the second switch, the third switch and the fourth switch.

6. A discharging method of a bus capacitor, applied to a controller of a DC-DC converter, wherein the DC-DC converter comprises the bus capacitor, a switch and a reactor, and the discharging method of the bus capacitor comprises:

detecting a voltage across the bus capacitor;

determining whether the voltage across the bus capacitor meets a preset condition, after the DC-DC converter is powered off; and controlling, in a case that the voltage across the bus capacitor meets the preset condition, the switch to be turned on or turned off to cause the bus capacitor, the switch and the reactor to form a current loop for consuming residual power of the bus capacitor, until the voltage across the bus capacitor does not meet the preset condition;

wherein the DC-DC converter is a bi-directional DC-DC converter, the bus capacitor comprises a first bus capacitor and a second bus capacitor, the switch comprises a first switch and a second switch connected in series, and a third switch and a fourth switch connected in series, and two series connection points are respectively connected to two terminals of the reactor; and wherein the controlling, in a case that the voltage across the bus capacitor meets the preset condition, the switch to be turned on or turned off to cause the bus capacitor, the switch and the reactor to form a current loop for consuming residual power of the bus capacitor, until the voltage across the bus capacitor does not meet the preset condition comprises:

controlling, in a case that the voltage across the first bus capacitor and/or the voltage across the second bus capacitor meet the preset condition, a first switch group and a second switch group to be alternately turned on or turned off, until neither the voltage across the first bus capacitor nor the voltage across the second bus capacitor meets the preset condition, wherein the first switch group is controlled to be turned on or turned off in response to a first preset periodic pulse, the second switch group is controlled to be turned on or turned off in response to a second preset periodic pulse;

wherein duty ratios of the first preset periodic pulse and the second preset periodic pulse are the same, and the first preset periodic pulse and the second preset periodic pulse are different in phase so that the first switch group and the second switch group are not simultaneously turned on;

wherein the first switch group comprises the first switch and the fourth switch that are simultaneously turned on or turned off, and the second switch group comprises the second switch and the third switch that are simultaneously turned on or turned off; and wherein each time both the first switch group and the second switch group are turned off, a current in the reactor decays to zero.

* * * * *